US010571360B2

(12) United States Patent
Lajnef et al.

(10) Patent No.: US 10,571,360 B2
(45) Date of Patent: Feb. 25, 2020

(54) METHODS FOR ESTIMATING REMAINING LIFE OF A MONITORED STRUCTURE

(71) Applicant: Board of Trustees of Michigan State University, East Lansing, MI (US)

(72) Inventors: Nizar Lajnef, Lansing, MI (US); Mohamed Rhimi, Elmouroujz (TR)

(73) Assignee: Board of Trustees of Michigan State University, East Lansing, MI (US)

(*) Notice: Subject to any disclaimer, the term of this patent is extended or adjusted under 35 U.S.C. 154(b) by 0 days.

(21) Appl. No.: 15/955,105

(22) Filed: Apr. 17, 2018

(65) Prior Publication Data

US 2018/0238768 A1 Aug. 23, 2018

Related U.S. Application Data

(63) Continuation-in-part of application No. 14/202,387, filed on Mar. 10, 2014, now abandoned.
(Continued)

(51) Int. Cl.
*G01M 5/00* (2006.01)
*G01L 1/16* (2006.01)
*G01M 15/14* (2006.01)

(52) U.S. Cl.
CPC ............ *G01M 5/0041* (2013.01); *G01L 1/16* (2013.01); *G01M 5/0008* (2013.01);
(Continued)

(58) Field of Classification Search
CPC .... G01M 5/003; G01M 5/0041; G01M 15/14; G01M 5/0016; G01M 5/0008; G01L 1/16
See application file for complete search history.

(56) References Cited

U.S. PATENT DOCUMENTS 7,757,565 B2   7/2010  Chakrabartty
8,056,420 B2   11/2011  Chakrabartty et al.
(Continued)

FOREIGN PATENT DOCUMENTS

CN    104123471 A  * 10/2014
SU     1816996 A1  *  5/1993

OTHER PUBLICATIONS

Mohammad Hanif Chaudhry, Resonance in Pressurized Piping Systems, B.Sc(Hons.) (Civil Engineering), West Pakistan University of Engineering and Technology, Pakistan, 1965 M.A,Sc (Civil Engineering), University of British Columbia., (Year: 1968).*
(Continued)

*Primary Examiner* — Matthew G Marini
(74) *Attorney, Agent, or Firm* — Harness, Dickey & Pierce, PLC

(57) ABSTRACT

A computer-implemented method is provided for estimating the remaining life of a structure being monitored by a sensor. The method includes: receiving data from a sensor, where the data is indicative of strain experienced by a structure and is reported as a plurality of cumulative distribution functions; extracting a probability density function from the data received from the sensor; computing a damage index for the structure from parameters of the probability density function, where the damage index is indicative of damage to the structure accumulated over time; and estimating a remaining life of the structure using the damage index.

17 Claims, 17 Drawing Sheets

Related U.S. Application Data

(60) Provisional application No. 61/775,960, filed on Mar. 11, 2013.

(52) U.S. Cl.
CPC ........ G01M 5/0016 (2013.01); G01M 5/0033 (2013.01); G01M 15/14 (2013.01)

(56) References Cited

U.S. PATENT DOCUMENTS

| | | | |
|---|---|---|---|
| 2006/0243056 A1 | 11/2006 | Sundermeyer et al. | |
| 2008/0047355 A1 | 2/2008 | Chakrabartty et al. | |
| 2010/0235109 A1* | 9/2010 | Zhao | G06Q 10/04 702/34 |
| 2012/0031193 A1* | 2/2012 | Adams | G01L 25/00 73/804 |
| 2012/0065901 A1* | 3/2012 | Bechhoefer | F03D 7/047 702/34 |
| 2013/0124118 A1 | 5/2013 | Monda et al. | |

OTHER PUBLICATIONS

A. Fatemi et al "Cumulative Fatigue Damage And Life Prediction Theories: A Survey of the State of the Art for Homogeneous Materials" (1996).

Vijay Rathod, Om Prakash Yadav, Ajay Rathmore, and Rakesh Jain, "Probabilistic Modeling of Fatigue Damage Accumulation for Reliability Prediction", International Journal of Quality, Statistics, and Reliability, vol. 2011 (2011).

U.S. Appl. No. 14/202,387, filed Mar. 10, 2014, Lajnef et al.

* cited by examiner

METHODS FOR ESTIMATING REMAINING LIFE OF A MONITORED STRUCTURE

CROSS-REFERENCE TO RELATED APPLICATIONS

This application is a continuation-in-part of U.S. patent application Ser. No. 14/202,387 filed on Mar. 20, 2014 which claims the benefit of U.S. Provisional Application Ser. No. 61/775,960, filed on Mar. 11, 2013. The entire disclosures of the above applications are incorporated herein by reference.

GOVERNMENT CLAUSE

This invention was made with government support under grant number DTFH61-08-C-00015 awarded by the U.S. Federal Highway Administration. The government has certain rights in this invention.

FIELD

The present disclosure relates to methods for estimating remaining life of a monitored structure, such as wind turbine blades.

BACKGROUND

Mechanical fatigue is the accumulation of damage in a structure under applied fluctuating stresses. Though the magnitudes of the applied stresses are less than the tensile strength of the material, the progressive fatigue damage may lead ultimately to mechanical failure. Fatigue life is defined as the number of load cycles necessary to induce failure and it depends on the level of fluctuating strain in the structure. Several fatigue prediction algorithms (e.g. Palmgren-Miner linear rule) rely on counting the number and magnitude of loading cycles applied to a structure. The fatigue in the structure can then be estimated using the cumulative statistics of these applied loads.

Recently, self-powered sensors have been developed for sensing fatigue in mechanical structures. Such sensors capture time compressed data which results in a loss of some information. Therefore, it is desirable to develop robust data interpretation techniques that are able to use the diminished data to achieve reasonable predictive capabilities regarding the damage to a monitored structure.

This section provides background information related to the present disclosure which is not necessarily prior art.

SUMMARY

A computer-implemented method is provided for estimating the remaining life of a structure being monitored by a sensor. The method includes: receiving data from a sensor, where the data is indicative of strain experienced by a structure and is reported as a plurality of cumulative distribution functions; extracting a probability density function from the data received from the sensor; computing a damage index for the structure from parameters of the probability density function, where the damage index is indicative of damage to the structure accumulated over time; and estimating a remaining life of the structure using the damage index.

In one aspect, the probability density function is extracted from the data received from the sensor by fitting the data received from the sensor to an equation which expresses the cumulative distribution function in terms of mean of strain distribution, standard deviation of strain distribution and total cumulative time of strain applied to the structure.

In another aspect, the data index is expressed as a ratio of mean of cumulative strain experienced by the structure at the time the data was reported by the sensor in relation to mean of cumulative strain experience by the structure at a baseline condition.

The remaining life of the structure can be estimate is different ways. For example, the remaining life may be estimated using a linear damage accumulation rule. In another example, the remaining life is estimated to be the expectation of the survival probability function, where the lifetime variable is expressed as a function of the damage index.

This section provides a general summary of the disclosure, and is not a comprehensive disclosure of its full scope or all of its features. Further areas of applicability will become apparent from the description provided herein. The description and specific examples in this summary are intended for purposes of illustration only and are not intended to limit the scope of the present disclosure.

DRAWINGS

Figure 1:
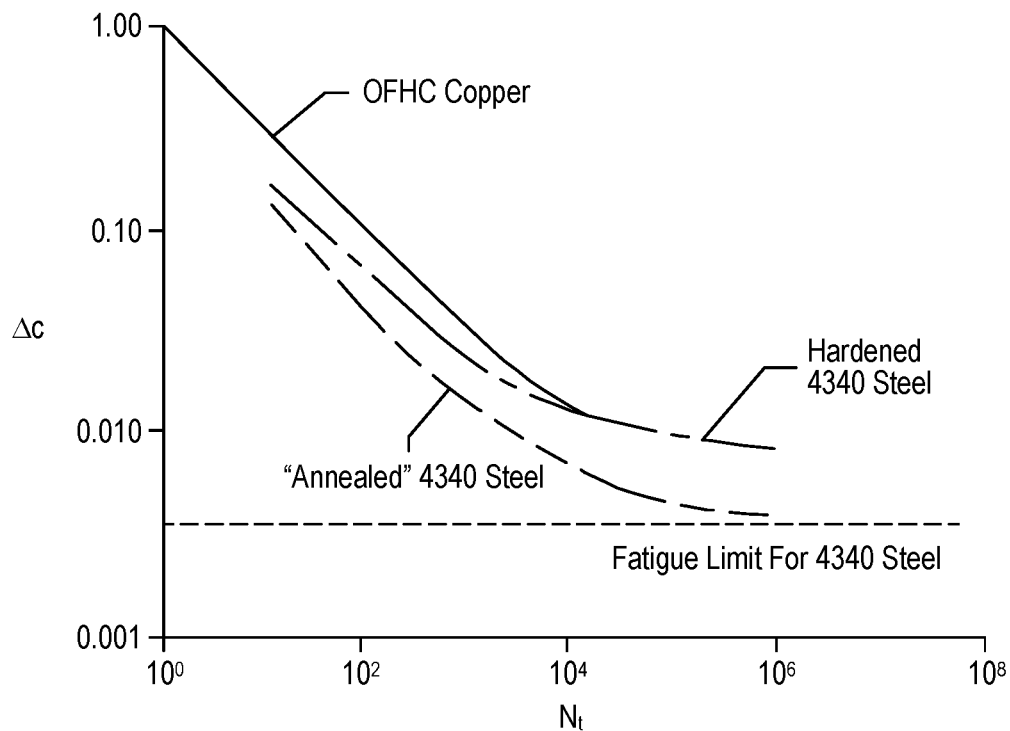
FIG. 1 is a diagram of an exemplary S-N curve which can be used to estimate fatigue life.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

Mechanical fatigue is the accumulation of damage in a structure under applied fluctuating stresses. Though the magnitudes of the applied stresses are less than the tensile strength of the material, the progressive fatigue damage may lead ultimately to mechanical failure. Fatigue life is defined as the number of constant amplitude load cycles necessary to induce failure in an initially undamaged component. Generally, the fatigue life of a mechanical component under cycling applied load depends on the level of fluctuating strain in the structure. With reference to FIG. 1, this can be represented by the S-N curve, which is obtained using experimental measurements. In the S-N curve, S is the mechanical strain level ($\Delta\varepsilon$) in the component under a harmonic load, and N is the number of cycles that causes failure of the component at that strain level.

The S-N curves can be used directly to estimate the fatigue life under constant amplitude harmonic load conditions. However, in most applications the applied load is not cyclic. The simplest approach to model fatigue behavior under variable amplitude load condition involves the concept of cumulative damage, which can be described using the Palmgren-Miner linear rule:

$$\sum_{i=1}^{m} \frac{n_i}{N_{fi}} = 1$$

where $n_1$ denotes total number of events when the electric signal generated by the piezoelectric transducer exceeded a threshold $a_t$. Miner's rule assumes that each strain cycle of a given magnitude consumes $1/N_{fi}$ of the total fatigue life, where $N_{fi}$ is the fatigue life of the specimen at the given strain amplitude (obtained from the S-N curve). A major step in the implementation of this approach is the identification of different loading events that contribute to fatigue damage. Counting algorithms are used to reduce any loading spectra to a series of equivalent stress-strain states. The experimental data for each stress-strain state is implemented with the Palmgren-Miner's rule to provide a summation of fatigue damage. Several empirical cycle counting methods have been developed for different applications. For the purpose of this disclosure, a modified level-crossing peak counting method is used. This method consists of detecting and summing the maximum level reached by different peaks of the applied strain function. It is readily understood that other counting methods may be employed.

Figure 2:
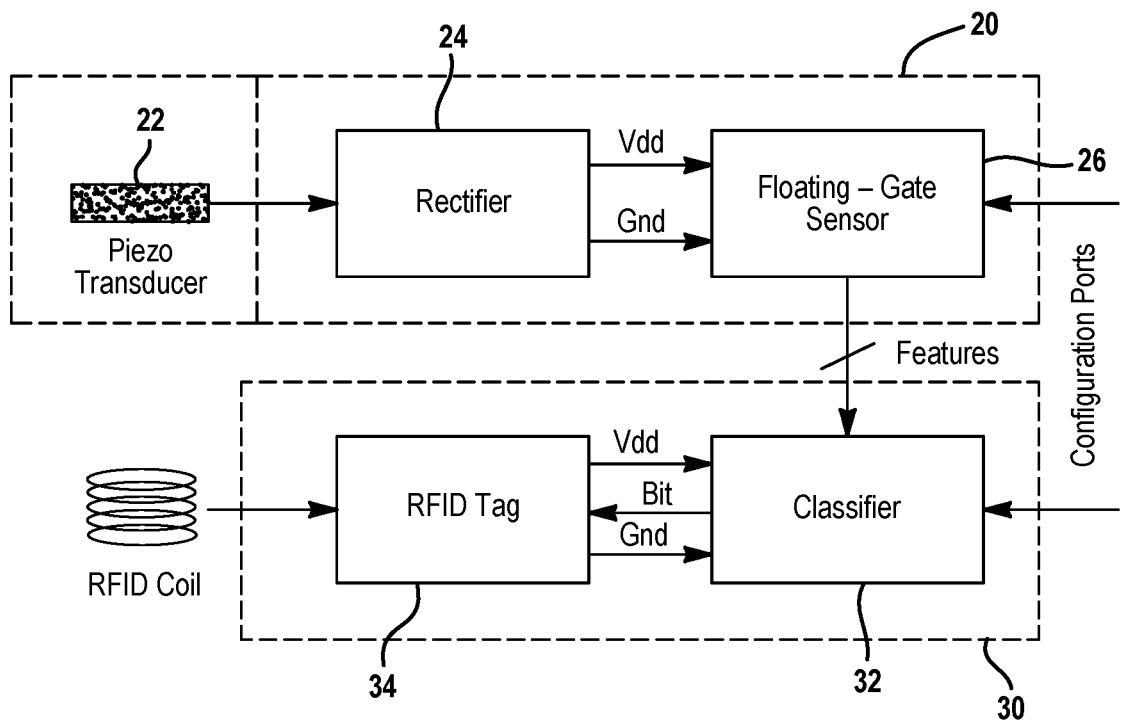
FIG. 2 is a block diagram depicting a system level architecture for an exemplary fatigue monitoring system.

FIG. 2 illustrates a system level architecture of an exemplary fatigue monitoring system 20. The fatigue monitoring system 20 is comprised of a piezoelectric transducer 22, a rectifier 24 and a floating gate sensor 26. The piezoelectric transducer 22 may be operably coupled to a structure being monitored, such as a bridge, road or medical implant. Stress applied to the monitored object causes the piezoelectric transducer 22 to generate a voltage signal While reference is made to particular structures, it is readily understood that the fatigue monitoring system has other applications (e.g., monitoring structural integrity of aircraft or vehicle components).

The floating gate sensor 26 continuously records the output of the piezoelectric transducer 22. The full-wave rectifier 24 interposed between the piezoelectric transducer 22 and the floating gate sensor 26 generates unregulated supply voltages (vdd and gnd) from the signal output by the transducer 22. In an exemplary embodiment, the full wave rectifier 24 is implemented using a standard diode bridge. For the prototype described below, n+– p-substrate and p+– n-well diodes were used, which naturally occur using electrostatic discharge (ESD) diodes. The supply voltages are used by a floating gate sensor 26 to compute the amplitude and duration statistics of the rectified signal. The floating gate sensor 26 then updates the internal variables which represent cumulative history of the mechanical strain cycles experienced by the monitored structure. The floating gate sensor 26 is self-powered and extracts all its operational energy from the rectified signal.

The fatigue monitoring system 20 can be interfaced with an RFID interrogation device 30 that is used to interrogate and/or download the recorded statistics. In particular, the floating gate sensor 26 is interfaced with the RFID interrogation device 30. The RFID interrogation device 30 includes a classifier 32 that uses the statistics stored by the floating gate sensor 26 to estimate the remaining life of the monitored structure. An RFID interrogation device 34 can then be used to transmit the estimate to an external interrogator. In one embodiment, the powering and operation of the RFID-subsystem is completely asynchronous and derives its power through RF coupling from an external interrogator.

Figure 3:
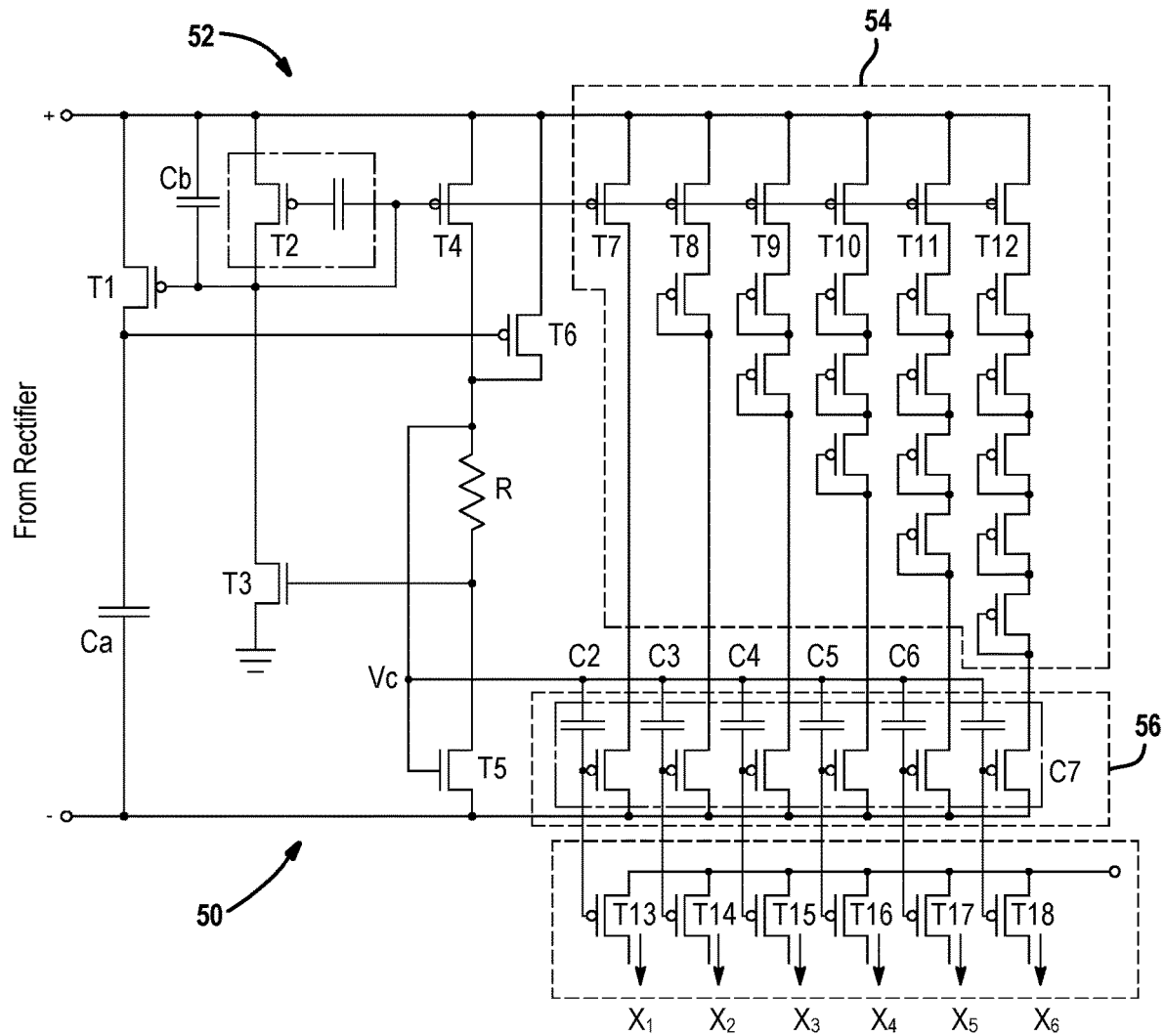
FIG. 3 is a schematic depicting an exemplary implementation of a floating gate sensor.

FIG. 3 illustrates an exemplary implementation of a floating gate sensor 50. The floating gate sensor 50 is comprised of a current reference circuit 52, a driving circuit 54 and a storage circuit 56. Each of these circuits is further described below.

In an exemplary embodiment, the reference current circuit 52 is implemented using transistors T1-T5 and resistor R. In a standard current reference circuit, the ratio of the pMOS current mirror transistors along with R determines the magnitude of the reference current. This exemplary implementation uses a floating gate transistor T2 coupled to a gate of transistor T1. The reference current is determined by the charge injected onto the floating gate T2 and the resistor value R. When all the transistors T2-T5 are biased in weak-inversion (i.e., operating in a sub-threshold mode), the reference current through T4 is given by $$I_{ref} \approx \frac{Q_f}{C_f R}$$

where $Q_f$ is the charge stored on the floating gate C1 and $C_f$ is the total floating gate capacitance. By accurately controlling the amount of floating gate charge, $Q_f$, small increments of reference current can be generated. The charge on the gate can be modified using hot electron injection or through tunneling. Injection adds electrons to the floating gate as a result its potential decreases which leads to an increase in the drain current through the transistor. For a pMOS transistor biased in weak-inversion drain-to-source voltages greater than 4.5V has been found to be sufficient for injection. Of note, the current reference circuit is able to compensate for temperature variations, as evident from reference current expression which is independent of temperature dependent parameters. Temperature compensation due to the current reference circuit has been validated through simulation and exhibits less than 2% variation over a 70° C. variation in temperature. Even though this feature is not required during normal operation of the implantable device, it has been observed that for some implants (hip implants) repeated wear and tear can dramatically increase in ambient temperature. While a particular circuit configuration was described above, it is readily understood that other circuit configurations, preferably having at least one floating gate transistor, may be used for the current reference circuit.

In the exemplary embodiment, a storage capacitor $C_a$ was used at the output of the rectifier to filter out unwanted high-frequency components. The size of the capacitor provides a trade-off between total discharge time versus the voltage swing at the sensor. For the prototype an external capacitor (10 nF) was chosen which led to voltage swing of up to 8V for 20V generated by the piezoelectric transducer. A voltage over-protection and clamping circuitry was integrated at the output of the diode bridge to prevent damage due to unwanted piezoelectric surges.

The storage circuit 56 is an array of floating gate transistors C2-C6 which provide non-volatile storage. A floating gate is a poly-silicon gate surrounded by an insulator, which in standard semiconductor fabrication process is silicon-dioxide. Because a floating gate is surrounded by high quality insulation any electrical charge injected onto this gate is retained for long intervals of time (>8 years). In the exemplary embodiment, each floating gate transistor C2-C6 also has a tunneling capacitor which is used for removing electrons (erase operation) from the gate. It is envisioned that other types of storage circuits are within the broader aspects of this disclosure.

An exemplary driving circuit 54 is interposed between the current reference circuit 52 and the array of floating gate transistors 56. In this exemplary circuit, transistors T7-T12 mirror the current in T4 to drive the floating gate transistors C2-C7. More specifically, the driving circuit is comprised of a plurality of circuit branches, where each circuit branch electrically couples to a different floating gate transistor in the array of floating gate transistors. Voltage drop in each branch will be controlled using diode connected pMOS transistors and will ensure different drain-to-source voltage across each of floating gate cells C2-C7. During the pre-calibration stage each of the floating gate cells are programmed (using tunneling and injection) to store a fixed amount of charge, hence a fixed gate voltage across C2-C7. When a rectified voltage is presented across the supply terminals (+−), the circuit generates a reference current and a stable voltage reference at node Vc. Depending on the magnitude of the rectified voltage, different cells C2-C7 start injecting charge on its floating gate. Likewise, other circuit configurations are envisioned for the driving circuit.

SpectreS based spice simulation of the current reference circuit demonstrates an activation profile of different floating gate cells C2-C7 at different peak amplitude. For this experiment a storage capacitor of 10 nF was chosen, and the duration of the piezoelectric pulse excitation was set to 2 seconds. The circuit exhibits a start-up time of 100 ms, which is sufficient for most structural engineering applications. The start-up however can be optimized by appropriately sizing the storage capacitor at the rectifier but at the expense of lower coupling voltage (rectifier). The simulation also shows poor current regulation of the reference circuit due to sub-threshold operation of the circuit but does not adversely affect the response of the sensor.

The results indicate that different floating gate cells in the array start injecting at different piezoelectric potential and therefore record cumulative amplitude statistics of a signal. The architecture therefore implements a self-powered flash data converter. The total charge accumulated on the floating gate is measured by sensing the current through the read-out transistors T13-T18. The transistors T13-T18 act as read-out transistors that are used to quantify the stored charge on floating gates C2-C7 by measuring the drain currents flowing through T13-T18. The read-out transistors are powered by an external interrogator by transferring energy via physical inter-connections or via RF coupling. Thus, the sub-circuit enclosed in the dotted line in FIG. 3 is to be implemented in the interrogation device 30 in FIG. 2. The drain currents through transistors T13-T18 represents a feature vector encoding the history of stress-strain patterns and is used by a classifier to generate time-to fail confidence scores. Further details regarding the exemplary floating gate sensor may be found in U.S. Pat. No. 8,056,420 which is incorporated herein by reference.

Figure 4:
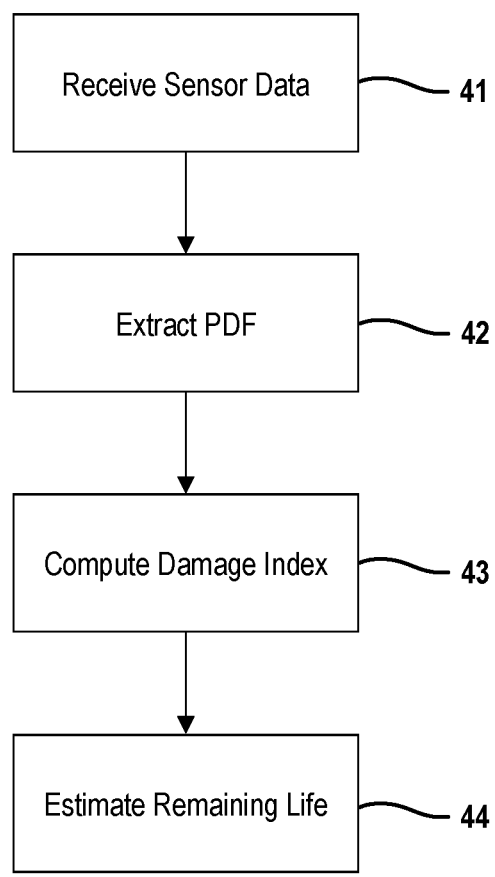
FIG. 4 is a flowchart providing an overview of a technique for estimating remaining life of a monitored structure.

FIG. 4 provides an overview of a robust data interpretation technique that is able to use the diminished data, for example from a floating gate sensor 26, to achieve reasonable predictive capabilities regarding the damage to a monitored structure. The time compressed cumulative data provided by the sensor results in a loss of information. The objective is to recreate the damage index variation curves using only the cumulative information tracked by the sensor.

First, data is received from a sensor at step 41, where the data is indicative of strain experienced by the monitored structure. In an exemplary embodiment, the data is read out from a floating gate sensor 26 using an RFID interrogation device 30 as described above. While reference it made to a floating gate sensor, it is understood that the broader aspects of this disclosure pertain to other types of sensors which accumulate time compressed data indicative of strain.

In one embodiment, the strain data may be reported by the sensor as a plurality of cumulative distribution functions. A probability density function is extracted at 42 from the data received from the sensor, for example by fitting the data to an equation which expresses the cumulative distribution function in terms of parameters of the probability density function, such as mean and standard deviation of the strain distribution as well as the total cumulative time of strain applied to the structure. Other techniques for extracting the probability density function are also contemplated by this disclosure.

From the parameters of the probability density function, a damage index is computed at 43, where the damage index is indicative of damage to the monitored structure accumulated over time. In one embodiment, the damage index is defined as a ratio of elastic moduli for the structure at a given time in relation to elastic moduli of the structure at a baseline condition. An exemplary method for derived the damage index is further described below.

Lastly, the damage index can be used at 44 to estimate the remaining life of the monitored structure. The remaining life can be estimated is different ways as will be further describer below.

Figure 5:
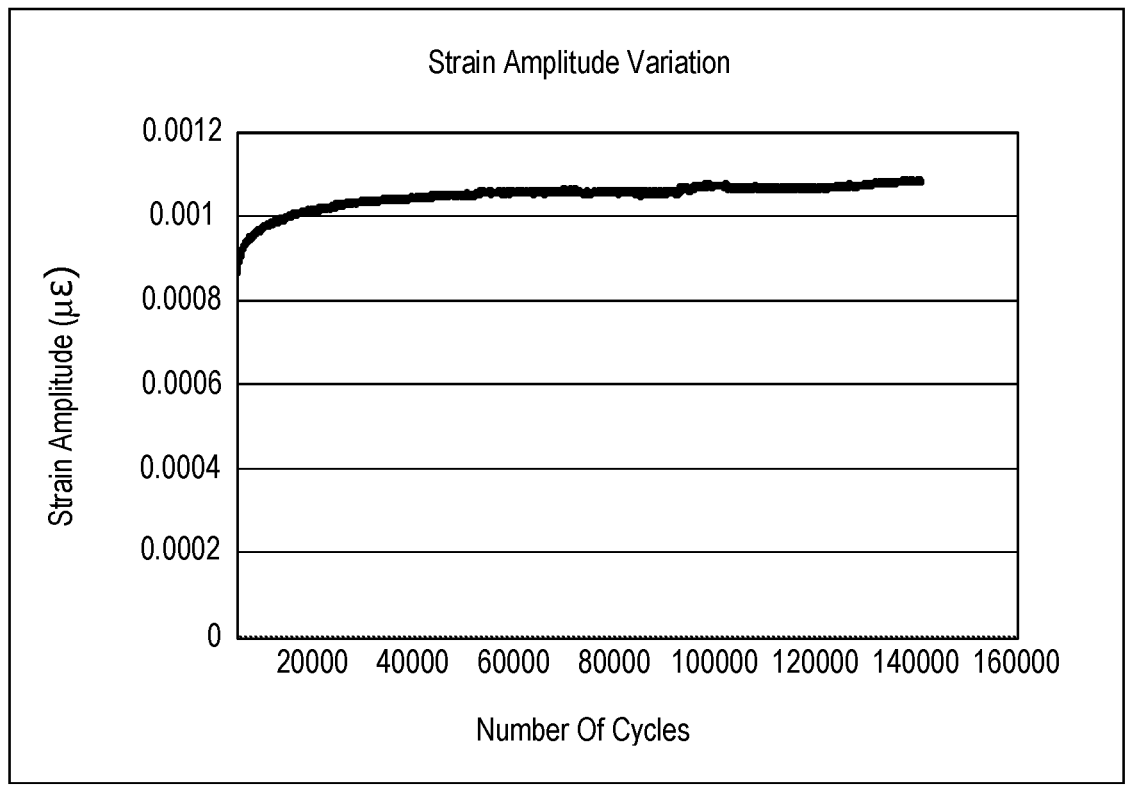
FIG. 5 is a graph showing the strain amplitude of a concrete beam under cyclic load with constant amplitude.

Measured peak strain distributions in a monitored structure are approximated by Gaussian distributions for all the considered cases. The variation of the strain amplitude over time is due to the increase of the compliance, i.e., induction of fatigue damage in the specimen. To illustrate the principles of this disclosure, a concrete beam will serve as the monitored structure. FIG. 5 shows the strain amplitude variation of a concrete beam over time under cyclic loading at constant amplitude. The strain amplitude is increasing explaining the loss in the elastic modulus of the beam. This increase in amplitude causes the increase of the output voltage amplitude that is recorded by the sensor.

The strain cumulative density function (CDF) is characterized by equation (3), where μ is the mean of the strain distribution, σ is the standard deviation reflecting the width of the normal distribution, and β is the total cumulative time of applied strain. The sensor output data is defined by these three parameters. In one embodiment, these parameters may be obtained by fitting the sensor's output distributions collected from all the memory cells.

$$F(\varepsilon) = \frac{\beta}{2}\left[1 - \text{erf}\left(\frac{\varepsilon - \mu}{\sigma\sqrt{2}}\right)\right] \quad (3)$$

In this way, the probability density function is extracted from the data reported by the sensor. Other techniques for extracting the probability density function are also contemplated by this disclosure.

Figure 6:
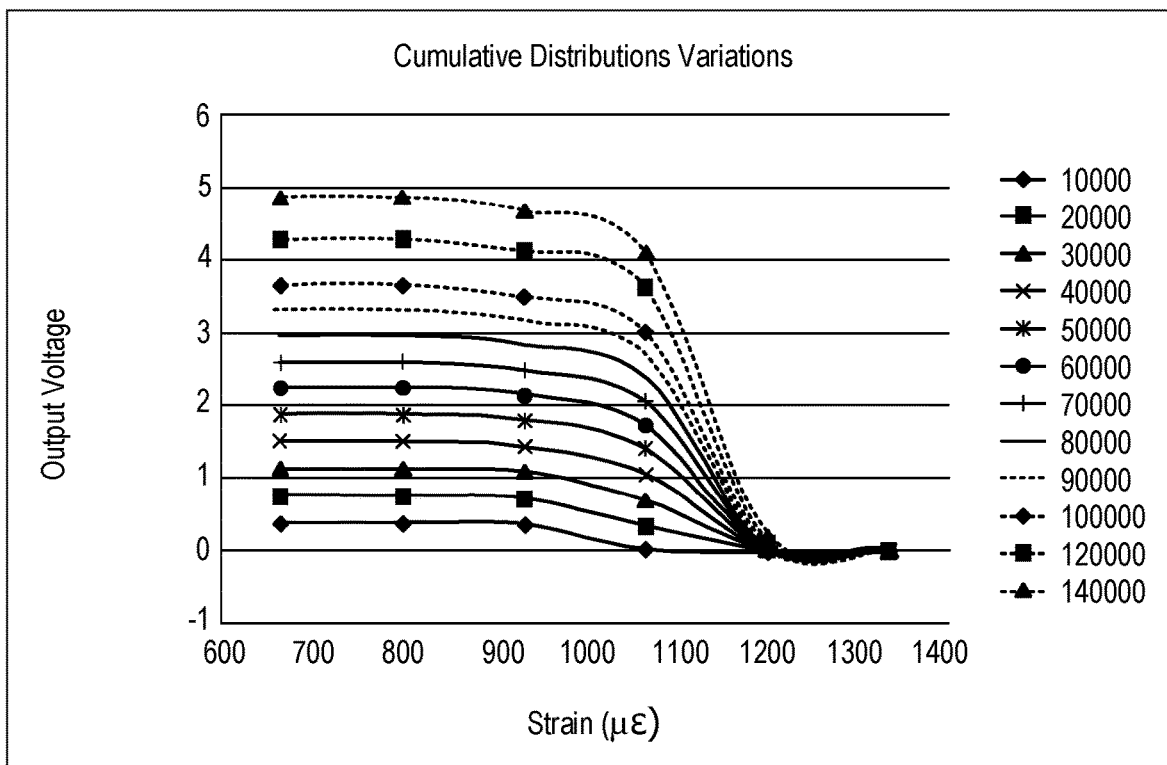
FIG. 6 is a graph showing cumulative distribution of strain expressed in terms of voltage.
Figure 7:
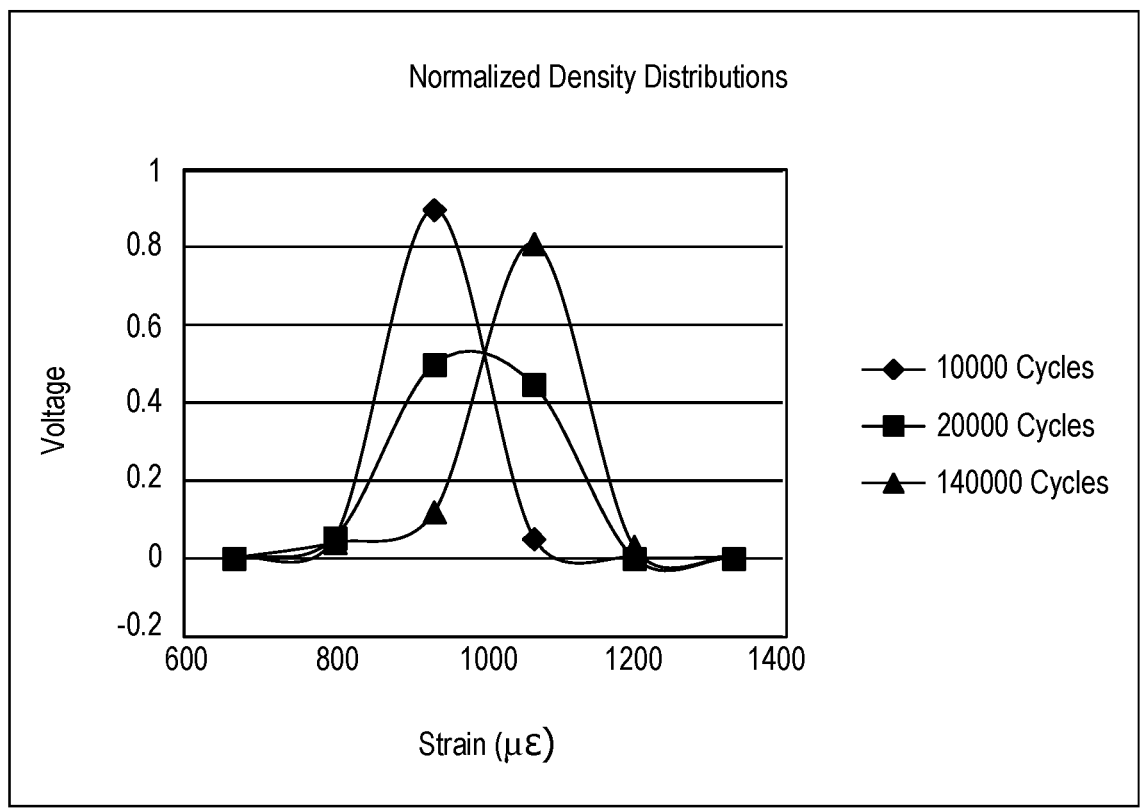
FIG. 7 is a graph showing the normalized probability density distribution reconstructed from measures cumulative distribution functions at different life stages.

FIG. 6 shows the measured strain CDF from the sensor at different life stages of the beam. The amplitude is expressed in voltage, which is directly related to the events cumulative durations. The shift of the mean due to the strain amplitude variation cannot be directly obtained from the cumulative distributions. FIG. 7 shows the normalized PDF reconstructed from the measured CDF at different life stages. The mean of the distributions, as shown in FIG. 7, is equal to the average induced strains amplitude, thus proving the consistency of the assumptions.

Figure 8:
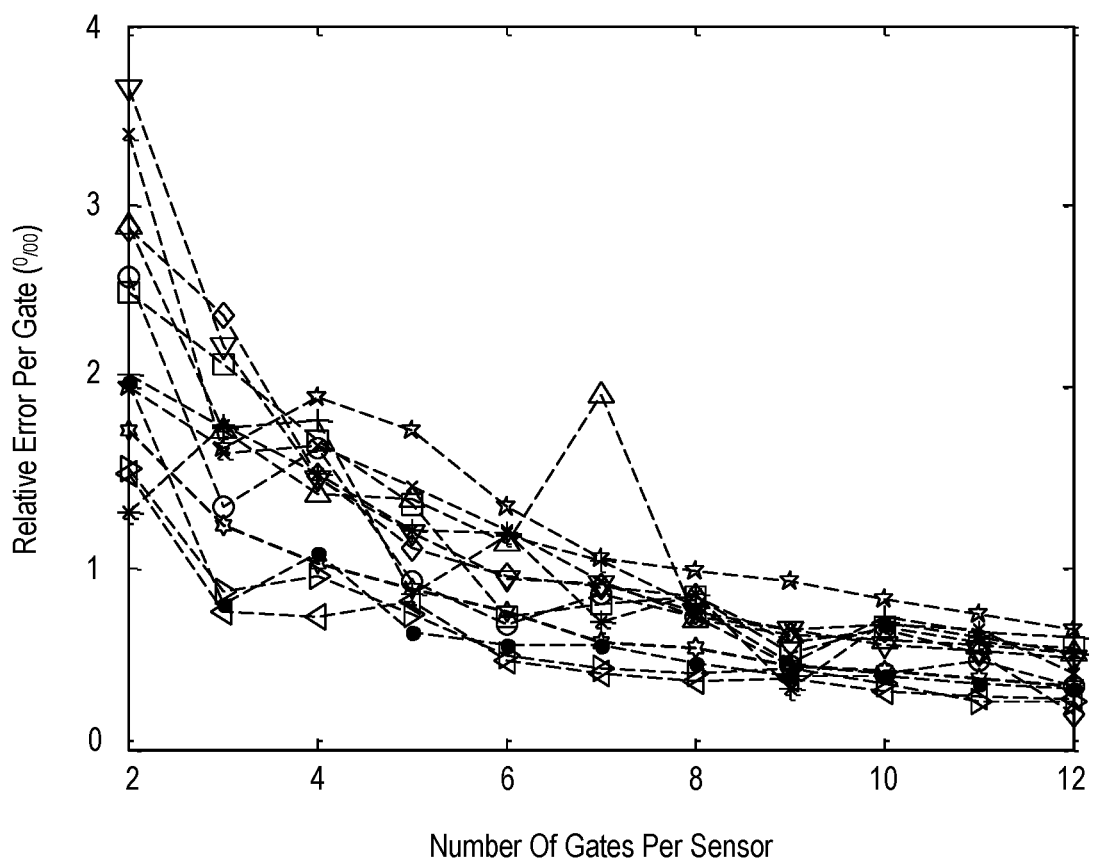
FIG. 8 is a graph showing the variation of the relative error per gate versus the sensor strain level for different specimens at different life stages.

To determine the final design of the sensor, the number of gates per sensor was evaluated using a sensitivity analysis. FIG. 8 shows the variation of the relative error per gate versus the sensor strain level for different specimens at different life stages. Starting from eight gates per sensor, the relative error is less than 1%. Although eight or more gates is preferable, the sensor may be implemented with a fewer number of gates.

Due to the missing load data and the fact that the sensor output response is collected periodically (for example once every year), the damage index cannot be evaluated as a deterministic value. In this disclosure, the damage index is considered as the ratio of the elastic moduli of the beam at any time "t" with respect to a predefined initial condition (baseline), such as when the sensor is deployed. The sensor output, as defined in equation (3), is a cumulative distribution of multiple normally distributed strain histograms defined by the following equation:

$$h_\varepsilon(\varepsilon) = \Sigma_i \frac{a_i}{\sqrt{2\pi\sigma_i^2}} e^{-\frac{(\varepsilon-\mu_i)^2}{2\sigma_i^2}} = \frac{a}{\sqrt{2\pi\sigma^2}} e^{-\frac{(\varepsilon-\mu)^2}{2\sigma^2}} \quad (4)$$

The cumulative loading time (α), the mean of the cumulative strain, and the standard deviation of the cumulative strain are evaluated from the parameters of the strain loading distributions:

$$\alpha = \Sigma_i \alpha_i \quad (5)$$

$$E[\varepsilon] = \Sigma_i \frac{\alpha_i}{\alpha} \mu_i \quad (6)$$

$$\text{Var}[\varepsilon] = \Sigma_i \frac{\alpha_i}{\alpha} \sigma_i^2 \quad (7)$$

Using equation (6) and (7), the mean and the standard deviation of the applied strain amplitude at a given time t can be evaluated using two consecutive readings, as expressed by the following equations:

$$\mu_t = \frac{\Delta(\mu\alpha)}{\Delta\alpha} \quad (8)$$

$$\sigma_t = \left(\frac{\Delta(\sigma^2\alpha)}{\Delta\alpha}\right)^{1/2} \quad (9)$$

In other words, the mean and standard deviation of the applied strain amplitude is determined from the data currently being reported by the sensor and the data reported the last time the sensor was interrogated.

Once the mean and the standard deviation of the strain distributions are evaluated, Taylor series with exact deviation are used to derive the mean and the variance of the damage index, which are given by the two equations below:

$$E[D] = \frac{\mu_0}{\mu_N} \quad (10)$$

$$\text{Var}[D] = \frac{\sigma_0^2}{\mu_N^2} + \frac{\mu_0^2 \sigma_N^2}{\mu_N^4} \quad (11)$$

where $\mu_N$ is mean of the applied strain amplitude at the present time as derived from data currently being reported by the sensor and $\mu_0$ is the mean of the application strain amplitude at the baseline condition. Other techniques for deriving the mean and variance are also contemplated by this disclosure. The damage index is also referred to herein as the damage coefficient.

The reliability index, considered with respect to a damage coefficient equal to zero, is then evaluated as follows:

$$\beta = \frac{\mu_0}{\sqrt{\sigma_0^2 + \frac{\mu_0^2 \sigma_N^2}{\mu_N^2}}} \quad (12)$$

The probability of failure defined as the probability of the damage coefficient being less than zero is then given by the following equation:

$$P(\text{failure}) = \frac{1}{2}\left[1 + \text{erf}\left(\frac{-\mu}{\sqrt{2\sigma^2}}\right)\right] \quad (13)$$

Expressing the failure of the structure in terms of probability of failure is more meaningful, given that the damage coefficient at failure is not a predefined value, and it varies from one specimen to another.

Concrete beam flexural bending fatigue tests were used to evaluate the methodology described above. IN the tests, a total of 23 plain PCC three-point single edge notched beam specimens (TPB-SEN) were tested under constant and variable amplitude fatigue loading. Two beam sizes were considered. The large size had a span of 16 in, a depth of 4 in (S/D=4), and a width of 4 in. The small size had a span of 8 in, a depth of 2 in (S/D=4), and a width of 2 in. The notch to depth ratio for each specimen was 0.35. A Crack Opening Displacement (COD) gage was used to measure the crack mouth opening and was attached to a pair of knife edges which were mounted to the bottom face of the beam by a fast drying epoxy resin, as recommended by RILEM (Shah, S. P., 1995). Each specimen was subjected to a 2 Hz cyclical load. Ten specimens were subjected to constant amplitude loading using a stress ratio (max load/peak load) of 0.895 (5) and 0.95 (5). The other specimens were subjected to variable loading in which both the R ratio (min/max load) and the stress ratio were varied at several stages throughout the test.

The concrete mix used in this research consisted of ASTMC-150 Type I cement, a natural sand, and a limestone coarse aggregate (nominal maximum size of 1 in). The water to cement ratio was 0.45 and the air content was 6.5%. The unit weight was 142 lb/ft.

The average 28 day Modulus of Rupture (MOR) and the split tensile strength, $f'_t$, were 760 psi and 419 psi, respectively. The 28 day compressive strength was 3626 psi. The specimens were cured for one year inside of a humidity room and then placed in ambient temperature for one more month to ensure minimal strength gain during fatigue testing.

Figure 9A:
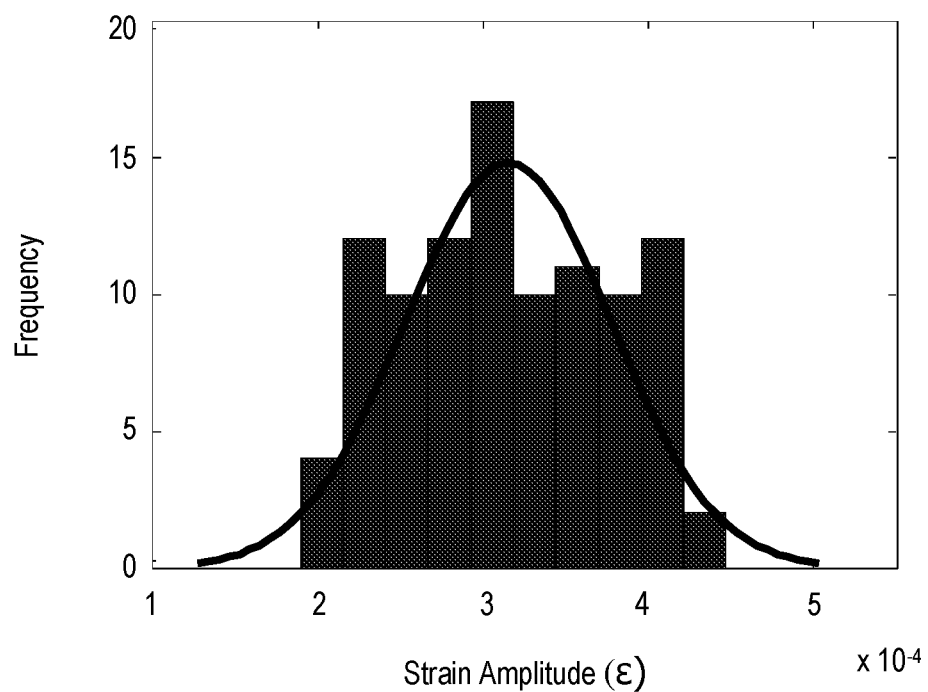
FIGS. 9A-9C are graphs showing strain distribution histogram at different life stages of the beam at 100 cycles, 25,000 cycles and 40,500 cycles, respectively.
Figure 9B:
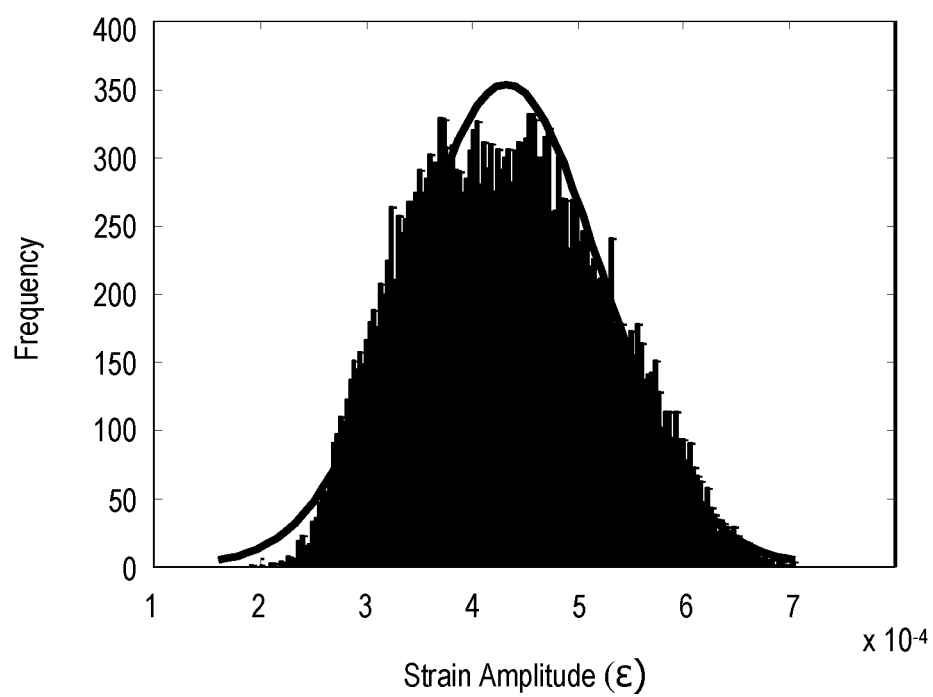
Figure 9C:
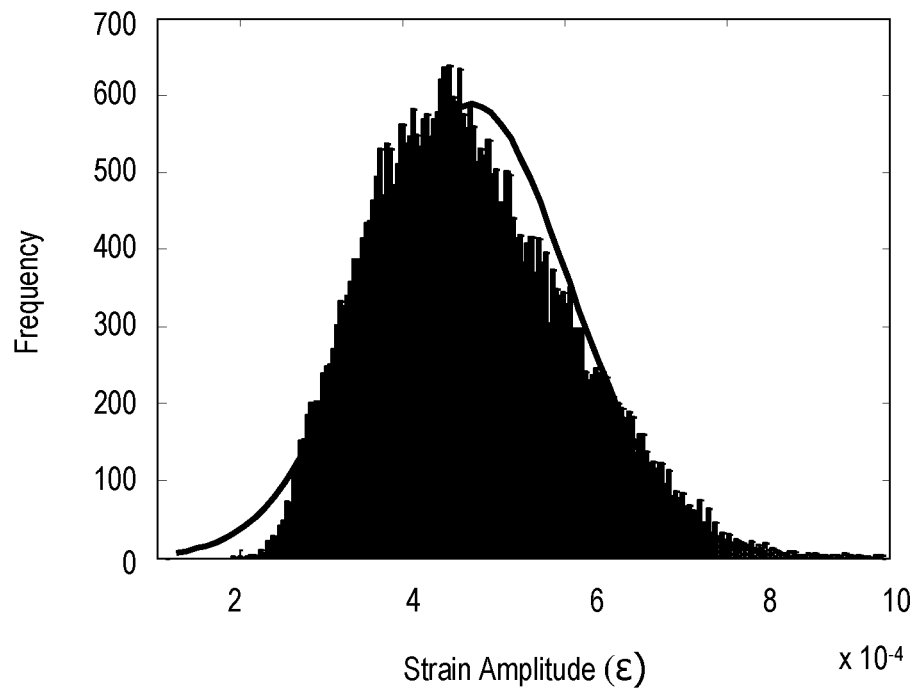

The full strain time history output from the COD gage was used as an input into the proposed damage algorithm. The measured peak strain distributions monitored by the COD gage over the entire life of the specimens under constant and variable loading can be approximated by Gaussian distributions as shown in FIGS. 9A-9C. The figure shows the strain distribution at different life stages of a specimen subject to variable loading. The shift of the strain amplitude over time is due to the variation of material stiffness which is happening because the material is damaged.

The same observations remain valid for strain distributions at different life stages of a specimen under constant loading. However, the standard deviation is higher under variable loading which is expected because there is an additional strain bandwidth caused by the variation in loading amplitude (and not damage).

Figure 10A:
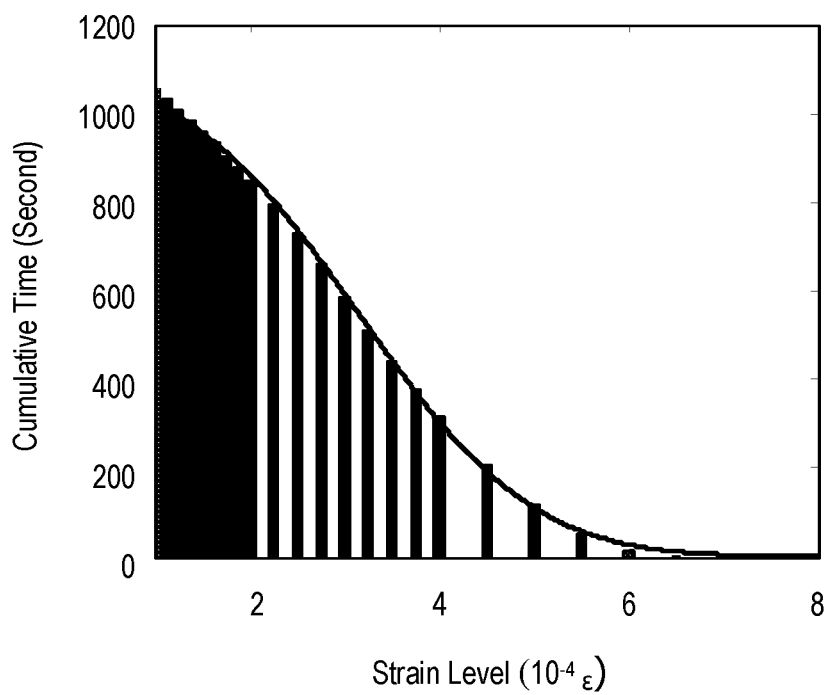
FIG. 10A-10C are graphs showing the sensor output fitted at different life stages of the specimen.
Figure 10B:
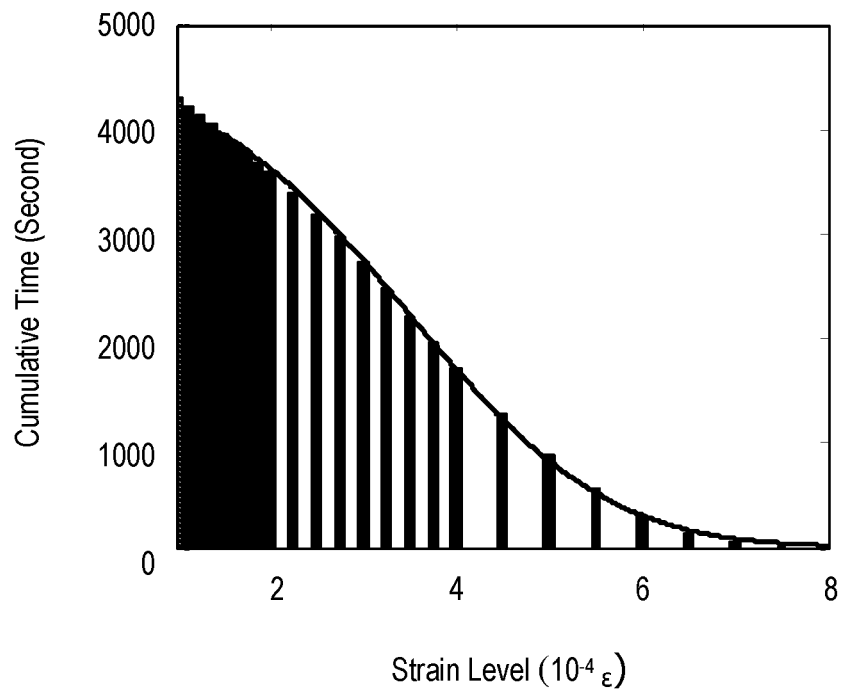
Figure 10C:
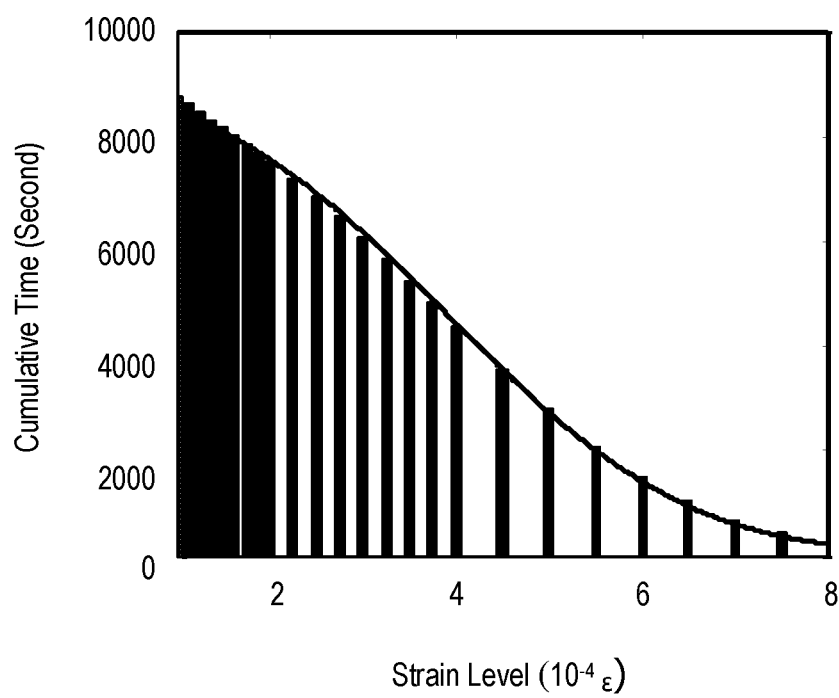

Using eight gates per sensor, the cumulative strain-time distributions are fitted as shown in FIGS. 10A-10C. Using the mean and the amplitude of the distribution, the actual induced strains distribution can be evaluated using equations (8) and (9). The initial $\mu_0$ is evaluated at the initial stage of specimen life (less than 100 cycles). Approximation of the extent of damages can thus be obtained.

Figure 11:
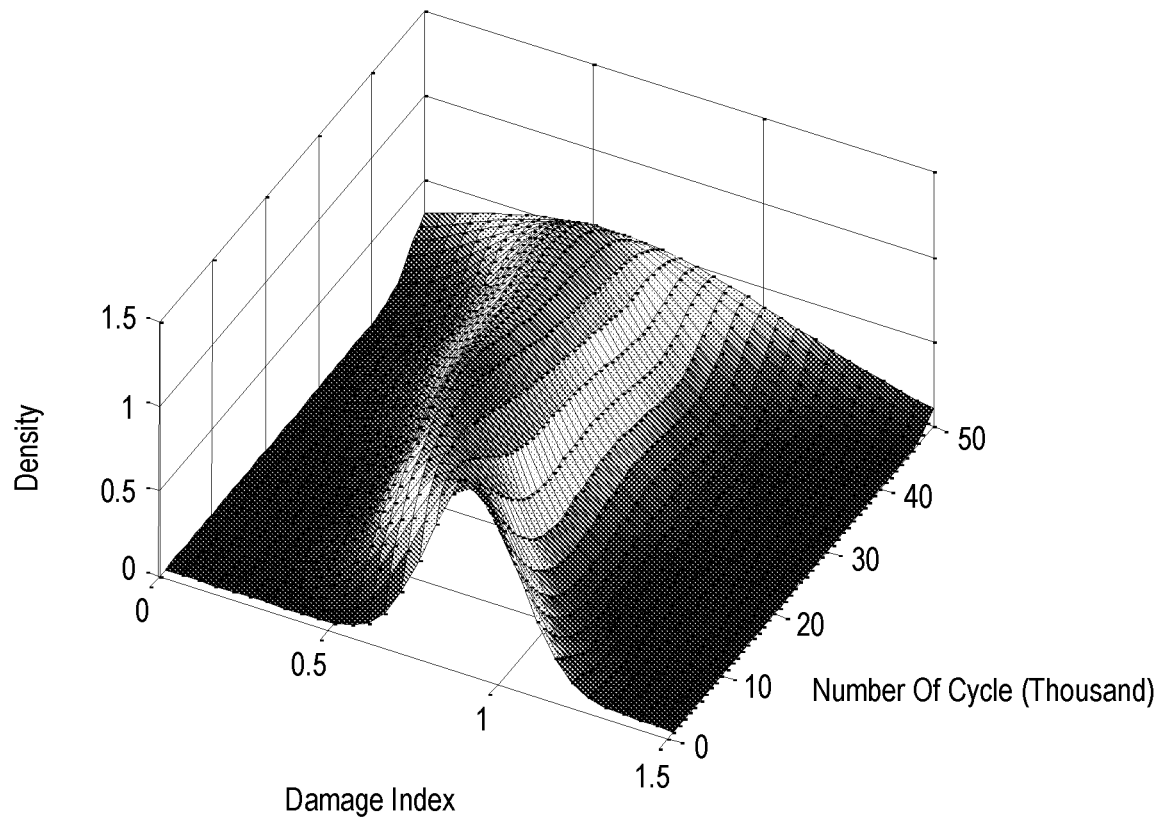
FIG. 11 is a graph showing probability distribution of the damage coefficient versus the number of loading cycles.
Figure 12A:
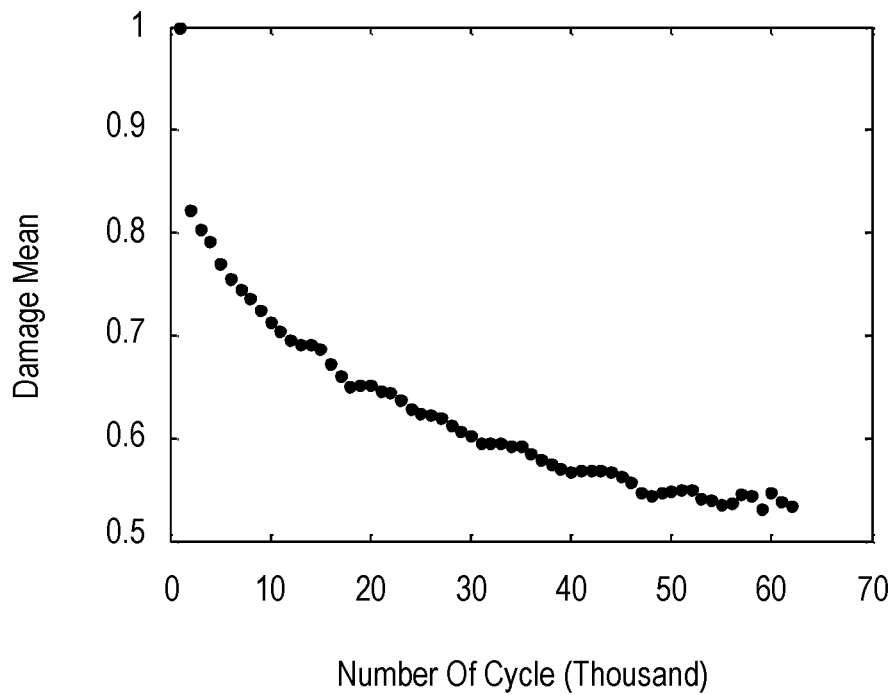
FIGS. 12A and 12B are graphs showing the mean and variance, respectively, of the damage coefficient.
Figure 12B:
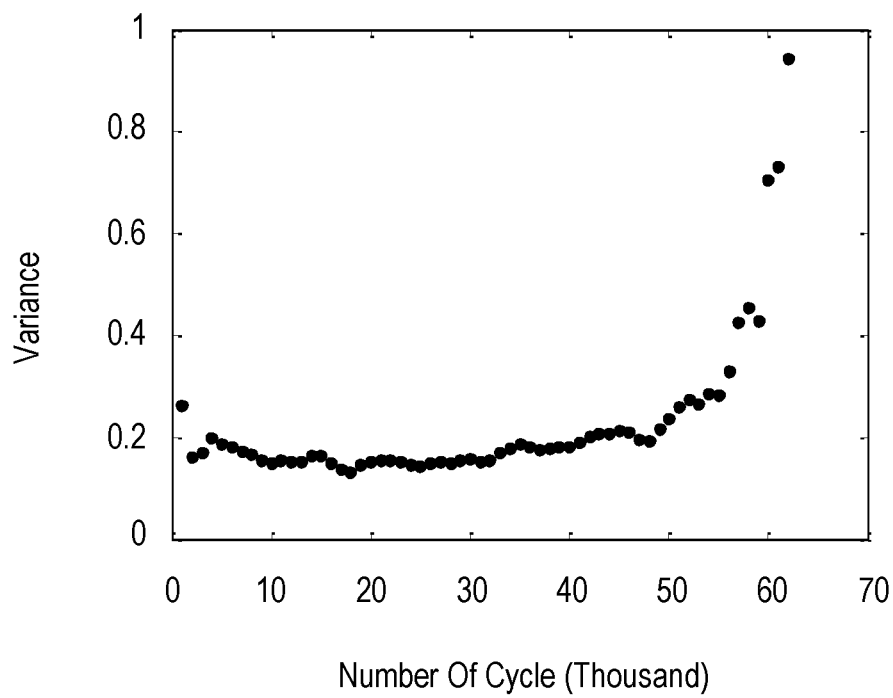
Figure 13A:
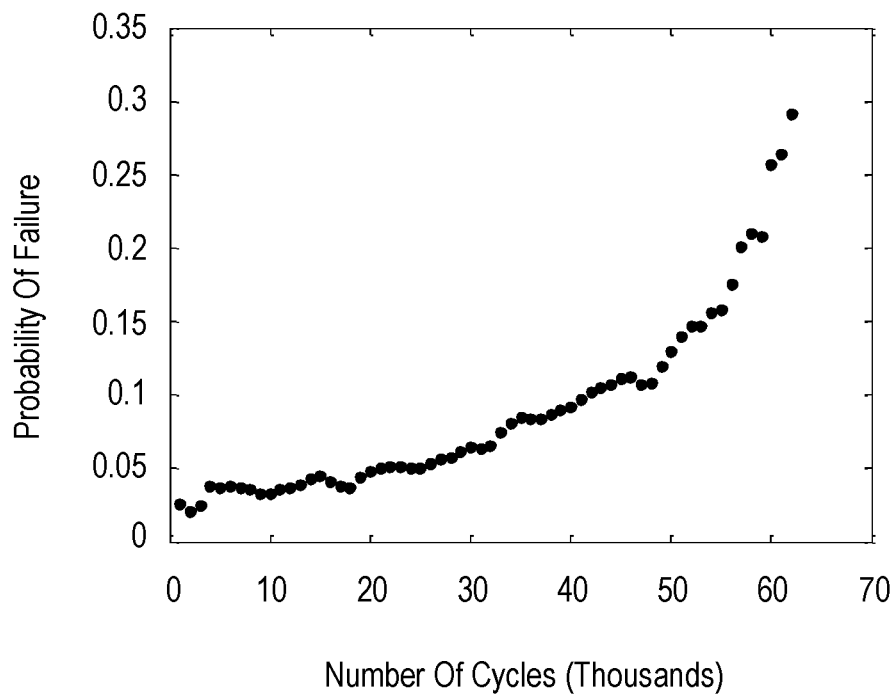
FIGS. 13A and 13B are graphs showing probability failure and reliability index of one of the samples in relation to the number of load cycles.
Figure 13B:
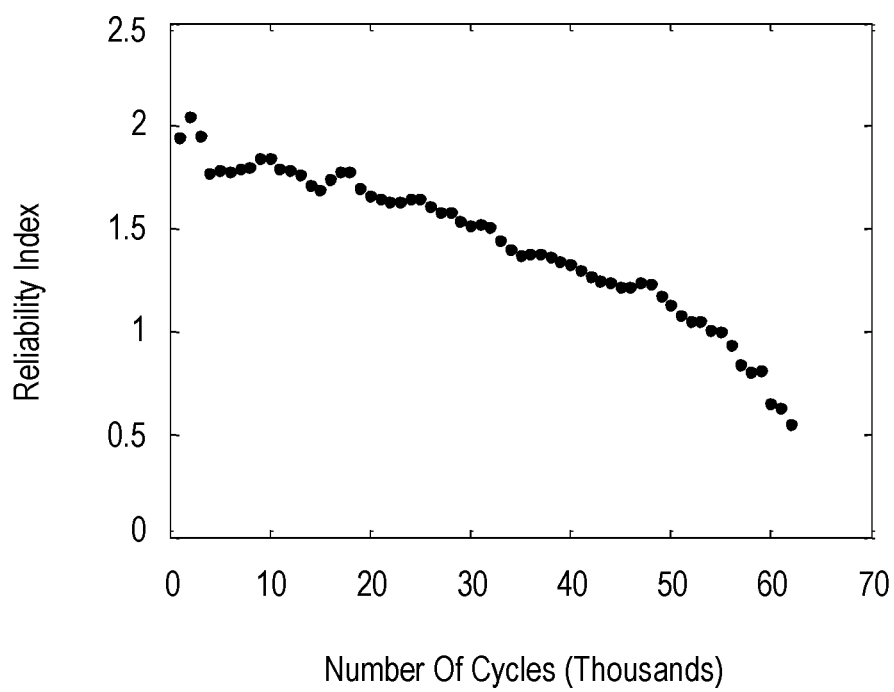

FIG. 11 shows the variation of the damage coefficient distribution versus the number of applied load cycles. The accumulation of damage is shown as a decrease of the damage coefficient mean value and a flattering of the distribution, explained by the increase of the uncertainty. As shown in FIG. 11, the mean damage index is decreasing over time, inversely proportional to the strain amplitude variation. However, the variance of the distribution is almost constant over the life time with a fast change at the failure stage of the beam explained by important variability of the induced strain during failure. Once the standard deviation and the mean are evaluated, the reliability index and the probability of failure can be calculated using equations (12) and (13). FIGS. 12 and 13 show the variation of the reliability index of the damage coefficient as well as the probability of failure versus the number of cycles.

Next, the remaining life of the host structure is estimated using the compressed data from the sensor and the models discussed above. The evaluation of the deterministic values of the damage coefficient based only on the mean value has proven to be an unreliable indicator of the remaining life. This is due to the high variability of the coefficient around failure.

Table 1 below shows the reliability index, the damage coefficient and the probability of failure at failure.

| Sample | Reliability index at failure | Probability of failure just before failure | Damage coefficient at failure |
|---|---|---|---|
| 1 | 0.54 | 0.29 | 0.3 |
| 2 | 0.77 | 0.25 | 0.44 |
| 3 | 0.72 | 0.31 | 0.56 |
| 4 | 0.51 | 0.31 | 0.46 |

Due to the high variability of the damage index at failure, the probability of failure at failure and the reliability index are not consistent. For better remaining life estimation, the damage index variability at failure should be accounted.

In one embodiment, a mechanistic-empirical approach is used to estimate the remaining life of a structure. Equations (14) and (15) below show the linear damage accumulation rule that is used in mechanistic-empirical models. The coefficients $\beta_i$, are calibrated for every specimen using the sensor damage reading at the damage inflection point. It has been observed that under constant amplitude loading, the inflection point between the deceleration and the acceleration cracking region occurs at approximately 40 to 50% of the total life of the specimen. Thus, the coefficients pertaining to the first half of the specimen's life should be similar to the second half. Once the coefficients are known, a remaining life prediction can be made.

$$D = \Sigma \frac{1}{N_f} \tag{14}$$

$$\text{Log}(N_f) = \beta_0 \left(\frac{1}{SR}\right)^{\beta_1} + \beta_2 \tag{15}$$

where D is the damage index and $N_f$ is the remaining life.

Table 2 shows the predicted remaining life using the described method based on the sensor output, and based on the calibrated coefficient of the linear damage accumulation rule for different tested specimens.

| Exact remaining life | Predicted remaining life using linear damage accumulation | Predicted remaining life using the sensor |
|---|---|---|
| 391 | 719 | 325 |
| 20527 | 716 | 5873 |
| 420 | 835 | 425 |
| 9350 | 902 | 7125 |
| 7022 | 922 | 11048 |
| 10980 | 990 | 23011 |

The loading of the specimens was stopped, and the remaining life was estimated using the different methods and based on the evaluated damage at that stage. The tests were then continued until failure in order to record the actual remaining life. As observed in the results, for the considered cases, the predictions evaluated using the localized sensor data are closer to reality than linear damage accumulation predictions based on averaged values.

In another embodiment, a probabilistic approach has been developed to estimate the remaining life of a structure. Reliability engineering and survival analysis mostly deal with positive random variable called "lifetime". The lifetime is manifested by a failure or another type of "end event". In this case, the failure is defined by the total break of the beam, and the lifetime variable is the time T at which the failure occurs with a cumulative distribution function F(T), defined by the probability of the damage index at time T being higher than the damage index at failure:

$$F(T) = P_r(D_f < D) \quad (16)$$

Figure 14:
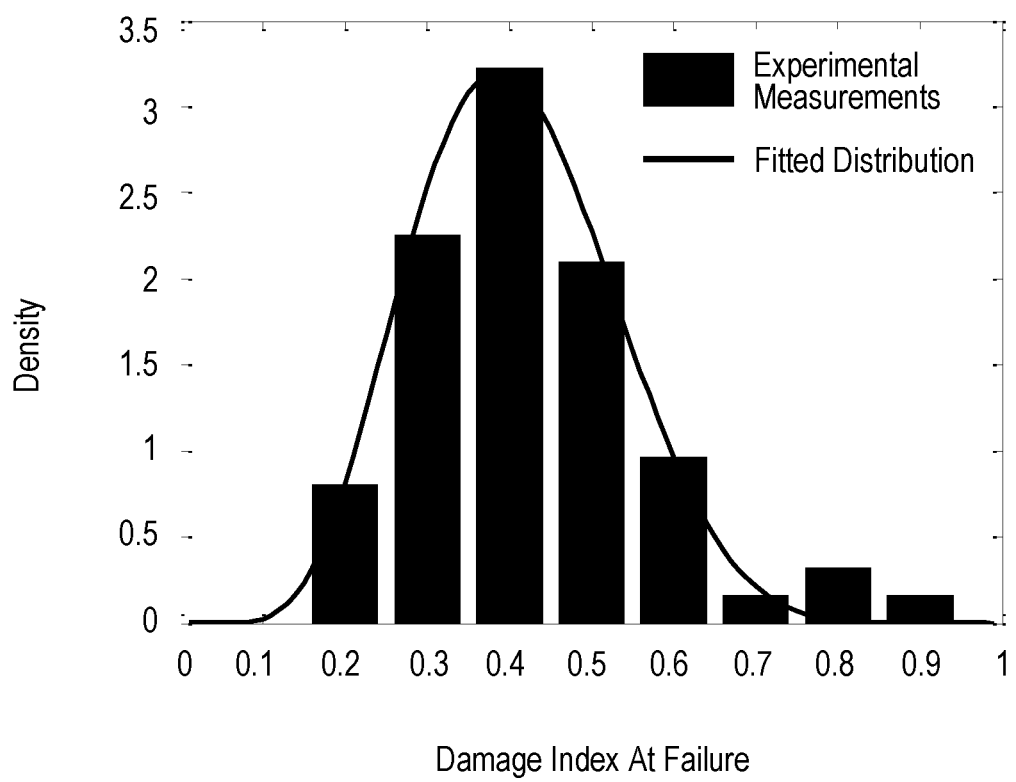
FIG. 14 is a graph showing the probability density function of the damage index at failure.

FIG. 14 shows the density function of the damage coefficient at failure. A total of 63 specimens have been tested and the index has been measured using the COD. The fitted distribution is a logit-normal distribution.

In the probabilistic approach, the objective is to evaluate the survival probability function of the specimens based on the evaluated damage index obtained using the sensor and also on the probability density function of the index at failure. The remaining life cumulative density function is defined using the law of conditional probability, the condition being that the beam did not fail at time t=x:

$$F_x(T) = \frac{P_r(x < T, x+t)}{P_r(x < T)} = \frac{F(x+t) - F(x)}{\overline{F}(x)} \quad (17)$$

The corresponding survival probability function of the beam is given by:

$$\overline{F}_x(T) = \frac{\overline{F}(x+t)}{\overline{F}(x)} \quad (18)$$

The remaining life is then estimated to be the expectation of the survival probability function:

$$REM = E(T_t) = \frac{\int_t^\infty \overline{F}(u) du}{\overline{F}(t)} \quad (19)$$

However, the life probability function is not defined.

The remaining life can be expressed as a function of the damage index probability function (the only information that the sensor can provide). Using a change of variable, equation (18) can be expressed as a function of the damage index:

$$REM = E(T_t) = \frac{\int_t^\infty \frac{\overline{F}_d(D) dD}{\frac{dD}{dt}}}{\overline{F}_d(D)} \quad (20)$$

where $$\frac{dD}{dt}$$

is the variation of the damage index with respect to time, evaluated by fitting a shape function to the discrete values evaluated using the sensor. Amongst others, the assumed shape functions are linear, exponential and arcsine.

Figure 15A:
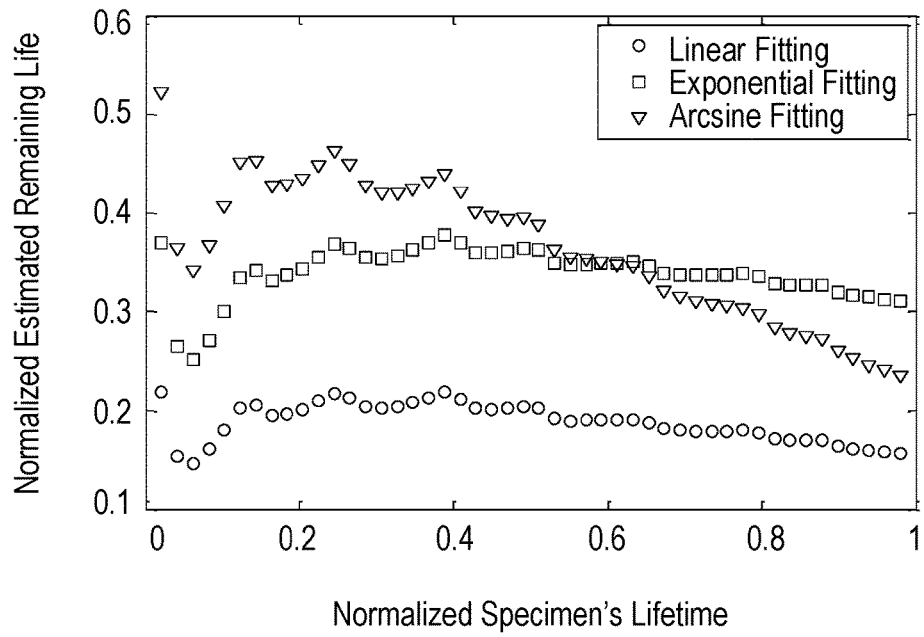
FIGS. 15A and 15B are graphs showing the normalized estimated remaining life and remaining life probability, respectively, in relation to the normalized specimen's lifetime using different fitting functions.
Figure 15B:
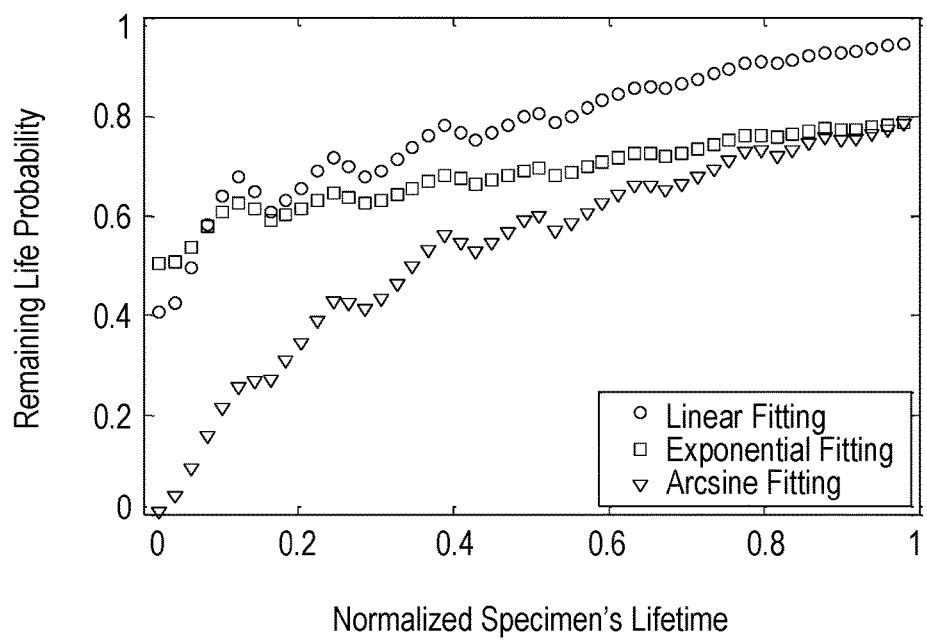

FIG. 15A shows the normalized predicted remaining life (equation (20)) derived using the developed methodology based solely on the sensor's output. The associated probability (from equation (17)) is shown in FIG. 15B. It can be seen that as the number of applied cycles increases, more readings are incorporated into the adaptive models which are used as fitting points. This implies that as the specimen gets closer to failure, the prediction accuracy improves, which is shown by the higher probability (reliability) of the estimated remaining life.

As discussed above, the probability of the remaining life is a good indicator of predictions reliability. As shown in table 3, for a probability higher than 0.6, the relative error of the predicted remaining life is less than 50%.

| Exact Remaining Life (RL) | Exponential Shape Function | | | Linear Shape Function | | | Arcsine Shape Function | | |
|---|---|---|---|---|---|---|---|---|---|
| | RL | Prob. | Error (%) | RL | Prob. | Error (%) | RL | Prob. | Error (%) |
| 0.9 | 0.1809 | 0.6406 | 71.91 | 0.3003 | 0.6071 | 59.97 | 0.4064 | 0.2133 | 49.36 |
| 0.8 | 0.2014 | 0.6565 | 59.86 | 0.3435 | 0.6149 | 45.65 | 0.4347 | 0.3459 | 36.53 |
| 0.7 | 0.2026 | 0.6913 | 49.74 | 0.3539 | 0.6309 | 34.61 | 0.4207 | 0.4346 | 27.93 |
| 0.6 | 0.2116 | 0.7688 | 38.84 | 0.3703 | 0.6746 | 22.97 | 0.4221 | 0.5455 | 17.79 |
| 0.5 | 0.2031 | 0.807 | 29.69 | 0.3629 | 0.6959 | 13.71 | 0.3881 | 0.5988 | 11.19 |
| 0.4 | 0.1919 | 0.8444 | 20.81 | 0.3496 | 0.717 | 5.04 | 0.3481 | 0.6436 | 5.19 |
| 0.3 | 0.1796 | 0.8751 | 12.04 | 0.3368 | 0.735 | 3.68 | 0.3115 | 0.6784 | 1.15 |
| 0.2 | 0.1719 | 0.9068 | 2.81 | 0.3287 | 0.7575 | 12.87 | 0.2836 | 0.7218 | 8.36 |
| 0.1 | 0.1617 | 0.9315 | 6.17 | 0.3171 | 0.7748 | 21.71 | 0.2525 | 0.757 | 15.25 |

In one example, the techniques described herein may be used to monitor a wind turbine blade. Wind turbine blades are used to efficiently harvest wind energy from the environment. The blades are one the most expensive components, and their size has become physically larger to maximize the production of energy. These factors make the repair and maintenance of these components more difficult. Therefore, many researchers have focused on developing a structural health monitoring system to assess the health status of the blades over time. It is possible to monitor global damage in the structure through modal analysis, however, monitoring local damage components can be difficult and sometimes not economical using commercial sensing technologies.

Figure 16:
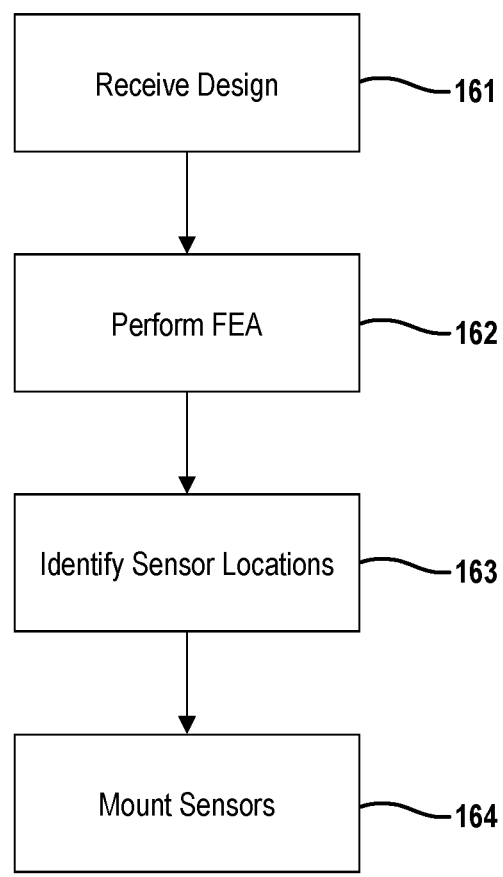
FIG. 16 illustrates preliminary steps for monitoring a wind turbine blade.

FIG. 16 depicts the initial steps for monitoring a wind turbine blade. The design for the wind turbine blade serves as the starting point. In one embodiment, CAD data for the blade of interest is received at 161. Structural health monitoring techniques can then be applied to the design of the wind turbine blade. For example, finite element analysis is performed at 162 on the CAD data for the blade. From the results of the finite element analysis, one can then identify one or more locations on the blade at 163 which are susceptible to fatigue and other damage.

Another approach is vibration based structural health monitoring, where the dynamic response of the structure itself is measured by means of instruments, such as accelerometers or strain sensors, and damage-sensitive features of the structure are extracted. Experimental model analysis and operational modal analysis are two techniques used in structural dynamics identification to extract features. While reference has been made to a few structural health monitoring techniques, other techniques for analyzing the structure (or its design data) to identity locations of a structure susceptible to damage are also contemplated by this disclosure.

Based on the analysis, the sensors are mounted at the identified locations of the blade as indicated at 164. In one example embodiment, the sensor includes a piezoelectric transducer as described above. For placement on the structure, the longitudinal axis of the piezoelectric transducer is aligned in relation to the identified location on the structure.

Figure 17:
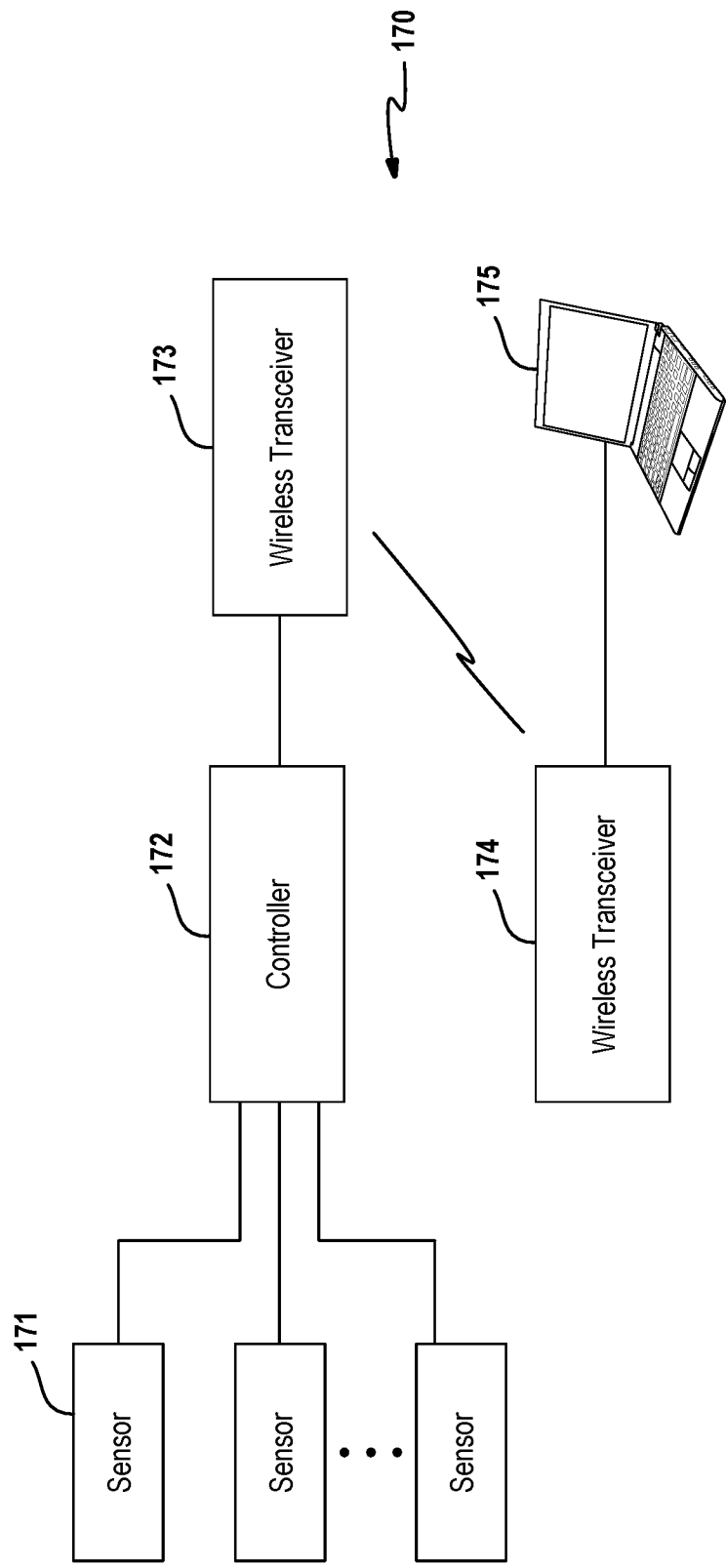
FIG. 17 is a diagram depicting a system for monitoring wind turbine blades.

FIG. 17 further illustrates a system for monitoring a wind turbine blade. The system is comprised of one or more sensors 171 mounted onto the blade. The sensors are preferably mounted at particular locations identified in the manner above. In one embodiment, each sensor may be a strain gauge. In other embodiments, each sensor is a self-powered sensor 50 as described in relation to FIG. 3. Other types of sensors are also contemplated by this disclosure.

A controller 172 is interfaced with the one or more sensors 171. The controller 172 is configured to receive signals from the one or more sensors 171 and compute a damage index for the structure. The controller may also estimate a remaining life for the structure using the damage index. In either case, the computations are made in the manner described above. In an exemplary embodiment, the controller 172 is implemented as a microcontroller. In this regard, controller 15 can be or can include any of a digital signal processor (DSP), microprocessor, microcontroller, or other programmable device which are programmed with software implementing the above described methods. It should be understood that alternatively the controller is or includes other logic devices, such as a Field Programmable Gate Array (FPGA), a complex programmable logic device (CPLD), or application specific integrated circuit (ASIC).

The controller 172 is also interfaced with a wireless transceiver 173. More specifically, the wireless transceiver is an RF module that transmits data in accordance with an RF protocol, such as Bluetooth low energy, Wi-Fi or Zigbee. Other types of wireless communication are contemplated as well, including cellular or satellite communications. In this example, the controller 172 and the wireless transceiver 173 are mounted on the wind turbine blade along with the sensors. In other examples, the controller 172 may be located nearby but not directly on the wind turbine blade.

The controller 172 in cooperation with the wireless transceiver 173 operates to transmit data to another computing device 175 located remotely from the wind turbine blade. The data is received via another wireless transceiver 174 embedded in or otherwise interfaced with the computing device 175. In this example, the transmitted data may be either the damage index for a particular location on the structure or the remaining life for the structure although other types of data may also be communicated. The damage index and/or the remaining life metric may be compared to a respective threshold by the computing device 175. When the damage index or the remaining life exceeds its respective threshold, an alert is generated. The alert may take different forms, including audible and/or visual. In some embodiments, the alert is presented to an operator of the computing device 175. Additionally or alternatively, the alert is sent by the computing device 175 to the operator via text message or email message. In some cases, the alert may advise the operator to retrofit and/or replace the blade. In other cases, the alert may include a more detailed report describing the location of the defects which prompted the alert. In any case, this approach eliminates the need for visual inspection of the wind turbine blade.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for monitoring a wind turbine blade, comprising:
    capturing, by a sensor disposed on a wind turbine blade, an amount of energy absorbed by the wind turbine blade at location of the sensor and storing the captured amount of energy as a plurality of cumulative distribution functions, where the sensor employs a piezoelectric transducer;
    extracting a probability density function from the plurality of cumulative distribution functions by fitting data from the plurality of cumulative distribution functions to an equation which expresses the cumulative distribution function in terms of the parameters of the probability density function;
    computing a damage index for the wind turbine blade from parameters of the probability density function, where the damage index is indicative of damage to the wind turbine blade accumulated over time; and
    estimating a remaining life of the wind turbine blade using the damage index;
    comparing the remaining life of the wind turbine blade to a threshold; and
    generating an alert for the wind turbine blade in response to the remaining life of the wind turbine blade being less than the threshold.

2. The method of claim 1 wherein the parameters of the cumulative distribution function are further defined as mean of strain distribution, standard deviation of strain distribution and total cumulative time of strain applied to the structure.

3. The method of claim 1 wherein the damage index is defined as a ratio of elastic moduli for the structure at a given time in relation to elastic moduli of the structure at a baseline condition.

4. The method of claim 1 wherein the damage index is expressed as a ratio of mean of cumulative strain experienced by the structure at the time the data was reported by the sensor in relation to mean of cumulative strain experience by the structure at a baseline condition.

5. The method of claim 4 wherein the damage index is further expressed as a variance of the ratio and a reliability measure of the ratio.

6. The method of claim 1 further comprises estimating a remaining life of the structure using a linear damage accumulation rule.

7. The method of claim 1 wherein estimating a remaining life of the structure further comprises
    defining a lifetime variable as time, T, at which the structure experiences a failure with a cumulative distribution function, where the cumulative distribution function is expressed as probability of the damage index at time T being higher that the damage index at failure; and
    estimating the lifetime variable to be the expectation of a survival probability function, where the lifetime variable is expressed as a function of the damage index.

8. The method of claim 1 further comprises monitoring the strain experienced by the structure using a self-powered sensor, where the self-powered sensor includes a piezoelectric transducer embedded in the structure, a non-volatile memory comprised of at least one floating gate transistor and a current reference circuit having a floating gate transistor operating in a weak-inversion mode, the current reference circuit adapted to receive a voltage signal from the piezoelectric transducer and output an injection current into the non-volatile memory.

9. The method of claim 1 further comprises repairing the wind turbine blade in response to receiving the alert.

10. A method for monitoring a wind turbine blade, comprising:
    receiving design data for the wind turbine blade;
    performing finite element analysis on the design data to thereby identify at least one location on the wind turbine blade susceptible to damage;
    mounting a sensor on the wind turbine blade at the identified location;
    capturing, by the sensor, amount of energy absorbed by the wind turbine blade at location of the sensor and storing the captured amount of energy as a plurality of cumulative distribution functions, where the sensor employs a piezoelectric transducer;
    extracting a probability density function from the plurality of cumulative distribution functions by fitting data from the plurality of cumulative distribution functions to an equation which expresses the cumulative distribution function in terms of the parameters of the probability density function;
    computing a damage index for the wind turbine blade from parameters of the probability density function, where the damage index is indicative of damage to the wind turbine blade accumulated over time; and
    presenting the damage index on a display of a computing device.

11. The method of claim 10 wherein the parameters of the cumulative distribution function are further defined as mean of strain distribution, standard deviation of strain distribution and total cumulative time of strain applied to the structure.

12. The method of claim 10 wherein the damage index is defined as a ratio of elastic moduli for the structure at a given time in relation to elastic moduli of the structure at a baseline condition.

13. The method of claim 10 wherein the damage index is expressed as a ratio of mean of cumulative strain experienced by the structure at the time the data was reported by the sensor in relation to mean of cumulative strain experience by the structure at a baseline condition.

14. The method of claim 13 wherein the damage index is further expressed as a variance of the ratio and a reliability measure of the ratio.

15. The method of claim 10 further comprises estimating a remaining life of the structure of the wind turbine blade based on the damage index using a linear damage accumulation rule.

16. The method of claim 15 wherein estimating a remaining life of the structure further comprises
    defining a lifetime variable as time, T, at which the structure experiences a failure with a cumulative distribution function, where the cumulative distribution function is expressed as probability of the damage index at time T being higher that the damage index at failure; and estimating the lifetime variable to be the expectation of a survival probability function, where the lifetime variable is expressed as a function of the damage index.

17. The method of claim 10 further comprises monitoring the strain experienced by the structure using a self-powered sensor, where the self-powered sensor includes a piezoelectric transducer embedded in the structure, a non-volatile memory comprised of at least one floating gate transistor and a current reference circuit having a floating gate transistor operating in a weak-inversion mode, the current reference circuit adapted to receive a voltage signal from the piezoelectric transducer and output an injection current into the non-volatile memory.

* * * * *